(12) United States Patent
Rixen et al.

(10) Patent No.: US 6,505,453 B1
(45) Date of Patent: Jan. 14, 2003

(54) T-LINK BETWEEN TWO PROFILE BARS

(76) Inventors: Wolfgang Rixen, Friedenstrasse 107-109, D-42699 Solingen (DE); Gerrit Pies, Friedenstrasse 107-109, D-42699 Solingen (DE)

(*) Notice: Subject to any disclaimer, the term of this patent is extended or adjusted under 35 U.S.C. 154(b) by 0 days.

(21) Appl. No.: 09/857,270

(22) PCT Filed: Dec. 6, 1999

(86) PCT No.: PCT/EP99/09512
§ 371 (c)(1),
(2), (4) Date: Jun. 1, 2001

(87) PCT Pub. No.: WO00/34670
PCT Pub. Date: Jun. 15, 2000

(30) Foreign Application Priority Data

Dec. 4, 1998 (DE) .......................... 198 55 928

(51) Int. Cl.$^7$ ................................. F16B 2/02
(52) U.S. Cl. .................. 52/655.1; 52/606.9; 52/582.2; 403/255; 403/187; 403/188
(58) Field of Search .............. 52/655.1, 656.9, 52/653.2, 582.2, 584.1; 403/254, 255, 381, 373, 374.1, 374.2, 374.3, 187, 188

(56) References Cited

U.S. PATENT DOCUMENTS

| | | | | |
|---|---|---|---|---|
| 3,574,367 A | * | 4/1971 | Jankowski | 403/201 |
| 3,966,342 A | * | 6/1976 | Moriya | 403/256 |
| 4,556,337 A | * | 12/1985 | Marshall | 403/255 |
| 4,583,359 A | | 4/1986 | Staeger | |
| 4,941,763 A | * | 7/1990 | Euteneuer | 403/3 |
| 5,209,598 A | * | 5/1993 | Zullig | 403/231 |
| 5,315,805 A | * | 5/1994 | Harsch | 403/170 |
| 5,657,604 A | * | 8/1997 | Malott | 403/252 |
| 6,322,277 B1 | * | 11/2001 | Jennings | 403/174 |
| 6,402,420 B1 | * | 6/2002 | Yang | 403/170 |

FOREIGN PATENT DOCUMENTS

| | | | | |
|---|---|---|---|---|
| DE | 3926598 | * | 10/1990 | 403/255 |
| FR | 2335718 | | 7/1977 | |
| FR | 2634525 | * | 1/1990 | 403/187 |
| GB | 1557693 | | 12/1979 | |
| GB | 2231379 A | * | 11/1990 | 403/255 |

* cited by examiner

Primary Examiner—Carl D. Friedman
Assistant Examiner—Brian E. Glessner
(74) Attorney, Agent, or Firm—Pandiscio & Pandiscio (57) ABSTRACT

A T-link of two profile bars, with a link (1) comprising two elongate clamping jaws (6) which can be tightened transversely by a fixing element (5) and can be locked in position, closing like tongs, in undercut casing grooves (7) of a second profile bar (8), and which engage endwise in a cavity (3) in a first profile bar (4) and can be clamped onto cylindrically parallel inner webs (10) of a first profile bar (4) that are arranged between said clamping jaws.

Improvement of the stability of the T-link is achieved in that the first profile bar (4) comprises more than two inner webs (10) evenly distributed about its inner circumference, in that tightened clamping jaws (6) exclusively clamp inner webs (10) with longitudinally linear and/or planar contact, and in that the clamping jaws (6) engage by each of their longitudinal edges (70) in a respective clearance (71) provided between the clamped inner web (10) and the inner web (10') adjacent thereto.

33 Claims, 11 Drawing Sheets

T-LINK BETWEEN TWO PROFILE BARS

BACKGROUND OF THE INVENTION

1. Field of the Invention

The invention is directed to a T-link of two profile bars, with a link comprising two elongate clamping jaws which can be tightened transversely by a fixing element and can be locked in position, closing like tongs, in undercut casing grooves of a second profile bar, and which engage endwise in a cavity of a first profile bar and can be clamped onto cylindrically parallel inner webs of the first profile bar that are arranged between said clamping jaws.

2. Description of Prior Art

A T-link having the aforesaid features is known from GB A 1,557,693. The first profile bar, configured as a rectangular tube whose narrow walls are provided with the mutually assigned inner webs, is connected to the second, polygonally implemented profile bar. One clamping jaw is arranged between each pair of inner webs and the wide wall of the tube and protrudes from the first profile bar, the fixing element being disposed inside the tube and actuated through a hole in the first profile bar. If the clamping jaws are tightened by means of the fixing element, the clamping jaws bear against and pinch the webs in the vicinity of the fixing element. At the same time, the end edges of the clamping jaws spread apart and grip, by a hook-shaped portion, the inner walls of the first profile bar, enabling the jaw portions of the clamping jaws protruding from the first profile bar to be locked in position, tong-like, in the undercut casing grooves of the second profile bar. Each clamping jaw is therefore braced at three locations, i.e., on both sides of the fixing element and at its edges inside the tube. However, the clamping locations, particularly those in the first profile bar, are small in area, and the T-link therefore seems to merit improvement in this respect. It is limited to the use of a rectangular first profile bar.

SUMMARY OF THE INVENTION

The object of the invention is, therefore, to improve a T-link having the features cited in the introduction hereto in such a way that increased connection strength is achieved, particularly with the use of profile bars of arbitrary cross section.

This object is accomplished in that the first profile bar comprises more than two inner webs evenly distributed about its inner circumference, in that tightened clamping jaws exclusively clamp inner webs with longitudinally linear and/or planar contact, and in that the clamping jaws engage by each of their longitudinal edges in a respective clearance provided between the clamped inner web and the inner web adjacent thereto.

It is of significance for the invention, first, that the first profile bar has more than two inner webs evenly distributed about its inner circumference. Such multiple inner webs can be distributed as needed, especially in the case of profile bars of arbitrary cross section. In such arrangements, the clamping jaws can be positioned at locations where they are of pre-eminent importance with regard to connection strength. It is of significance, further, that tightened clamping jaws exclusively clamp inner webs. There is no need for contact with the inner walls of the first profile bar. The inner contour of the first profile bar, and thus its outer contour as well, are of no importance with regard to the connection strength of the T-link. The requisite connection strength is instead achieved by the fact that the clamping is effected with longitudinally linear and/or planar contact. This consequently produces long and/or large-area clamping regions that make it possible to obtain an adequate force fit between the clamping jaws and the inner webs. The large contact areas of the jaws on the inner webs prevent stress peaks that might deform the inner webs or the first profile bar. At the same time, the inner webs make it possible for the link to be inserted to its full clamping length into the first profile bar and thus for its position to be adjusted as need be. It is of significance, further, that the clamping jaws engage by each of their longitudinal edges in a clearance-provided between the clamped inner web and the inner web adjacent thereto. The clamping jaws are therefore realized with the largest possible cross section. Their longitudinal edges can be disposed near the inner wall of the first profile bar, thereby permitting a large jaw cross section. In this way, clamping forces acting on the inner webs are not adversely affected by instabilities of the clamping jaws caused by unsatisfactory cross-section design.

An advantageous T-link is realized so that the inner webs are distributed about the inner circumference of the first profile web at intervals of forty-five angular degrees. Thus, there are three different options for arranging the clamping jaws in the first profile bar, and the second profile bar can thus be arranged in three different angular positions with respect to the first. This is of significance in particular when the profile bars have rectangular or non-round cross sections that must be used to capacity in order to impart particular loading and/or shape characteristics to a structure made from profile bars. To promote the secure retention of the link in the first profile bar, the inner webs of the first profile bar are arranged diametrically opposite each other and evenly distributed about the circumference of the inner wall of the first profile bar. In this way, the clamping jaws of the first link embrace two inner webs at a time, thereby achieving good retention. Tolerance in obtaining a firm seat for the clamping jaws is provided in that the inner webs can be clamped more forcefully than necessary without causing problems, and can even undergo some plastic deformation without any adverse effect on the stability and functional efficiency of the first profile bar or the link. This is especially advantageous with regard to nonprofessional users, since the proper locking force is not always applied. If the inner webs are evenly distributed about the circumference of the inner wall of the first profile bar, the link can be applied in different positions of the first profile bar, thereby permitting greater flexibility and easy assembly.

The T-link can be realized so that each of the inner webs is aligned with one of the casing grooves. This embodiment is especially advantageous if the first profile bar is provided outwardly with casing grooves over at least some portions of its circumference. This improves the bending rigidity of the first profile bar and further stiffens its inner wall, especially in the region of a casing groove.

An advantageous improvement of the T-link is distinguished by the fact that each inner web has a thick base and, extending radially therefrom, a thinner clamping strip that can be clamped between the clamping jaws. The thick base is designed to improve stability: not only the stability of the first profile bar, but also, and more important, the stability of the inner webs, to the extent that they are realized to extend comparatively far into the interior of the first profile bar. The thinner clamping strips might cause instabilities if, for structural reasons, the clamping jaws did not extend near enough to the inner walls of the profile bar. The stability of the thin clamping strips would then be inadequate near the inner wall of the first profile rod. This is particularly a concern when a structural system is designed to employ first profile bars of different cross sections that are to be used with same-sized clamping jaws. It is then necessary to use wider inner webs, i.e., inner webs that project farther radially inward.

In accordance with the foregoing, the T-link can be improved in such a way that, the width of the clamping jaws being given, the extension of the thick bases of the inner webs in the radial direction is determined by the distance between two diagonally opposite clamping strips. Such embodiments find application particularly in connection with the use of first profile bars in which oppositely disposed inner webs are of unequal width, for example because the cross sections comprising inner webs are configured asymmetrically or in another special manner.

It can be advantageous to realize the T-link so that when the profile bars are in a final a assembled position, the fixing element of the link can be actuated through a clearance between one end of the first and a casing surface of the second profile bar. Actuating the fixing element of the link through a clearance between one end of the first profile bar and a surface of the second profile bar when the profile bars are in a final assembled position makes it possible to link a large variety of profile bars of different shapes that need not be coordinated with one other. There is no need for either the first or the second profile bar to have fixed positions for holes or crosscuts, which would make it difficult for a nonprofessional user to dimension the profile bars. The link between the profile bars is therefore one that can readily be assembled and that effectively withstands longitudinal and transverse loads. It is nearly impossible for the link to be lost or to slip down into the first profile bar, because the fixing element, in addition to serving the purpose of clamping, simultaneously acts as a coupling while the structure is being assembled or moved.

Particularly in the foregoing embodiment, the end of the first profile bar can be realized without a retaining hole or an actuating hole. Thus, there is no need either for a retaining hole in which a portion of the link must be braced so as not to be pulled longitudinally out of the first profile bar, or for an actuating hole for actuating the fixing element. Such embodiments make it possible for profile bars to be cut to length at any desired location. This makes for minimal technical expenditure and consumption of time. For example, it is not necessary to maintain any preset spacing between the link and the first profile bar, and the profile bars can also, if necessary, be positioned and secured within a range of spacings from each other that is defined by the longitudinal extension of the fixing element. Subsequent adjustments can still be made, despite the presence of a clamping T-link. The relative positions of the two profile bars can be altered without disassembling the link or the profile bars. Thus, the T-link can be used without problems by one person, who, moreover, need not possess any specialized technical knowledge. The T-link can therefore be used satisfactorily by lay people and can readily be sold to anyone.

To improve protection against loss and to achieve greater rigidity and more compact construction plus higher stability, the link consists of no more than two clamping jaws realized as separate parts, adjustably connected by the fixing element. Few manipulations are necessary to fit this minimal number of parts together to form the link and attach them to the second profile bar. The fixing element holds the clamping jaws together while they are being mounted in place, and in the mounted state exerts a locking force thereon that presses the two separate parts of the link together or apart, thereby securing them to the first and second profile bars.

If a fixing element realized as a screw is inclined with respect to the longitudinal direction of the first profile bar and/or the end of the first profile bar is disposed at a distance from the second profile bar, a tool can readily be deployed between the two profile bars. The inclined screw inserted in the inclined screw insertion channel can be manipulated on the link both at its head end and at its foot end, provided that there is sufficient spacing between the profile bars, especially in the case of the second variant.

If the screw serving as the fixing element is tilted with its head toward the second profile bar, the fixing element can be actuated through the clearance between the profile bars even when the spacing between the two profile bars is very small, for example due to the meeting of a straight with a curved profile bar. Whether or not the head of the screw can be reached depends solely on the diameter of the tool. Depending on the implementation of the screw head, the spacing between the two profile bars can be reduced further if a very narrow tool is selected. The force that must be applied is not very great, even with thick profile bars, because of the direct conversion of the force.

It is advantageous if the link has, for the fixing element, one hole extending perpendicularly to the clamping jaws and another hole extending obliquely thereto. In this way, the link can be used both for screws that are inserted straight and those that are inserted obliquely. This makes it a universally applicable type of link, thus lowering production costs; it is not necessary for the user to purchase different types of links, even if he plans to interconnect an extremely wide variety of profile bars, especially hollow profile bars.

So that the link can be secured perpendicularly in the same casing grooves of the second profile bar in different angular positions with respect to the longitudinal axis of the profile bar, the link comprises slots in the clamping jaws for the insertion of the fixing element and/or the tong legs of the link can be clamped to the second profile bar in different angular adjustments of the link by means of ball-shaped leg ends that are inserted into the undercuts of the casing grooves. In this way it is possible to make angular adjustments (oblique angle $\pm\alpha$) of the first profile bar to either side of the normal position ($\alpha=0$). The presence of a slot in one clamping jaw ensures that the strength and quality of the connection will be the same as with vertical insertion.

To increase stability, it is advantageous that the clamping jaws be in a reciprocal positive engagement that prevents relative transverse and/or parallel movement. Such reciprocal positive engagement substantially increases stability with only a small increase in materials-related and production expenditure. The positive engagement is brought about simply by fitting the clamping jaws of the link together, and can be released in the same simple manner if the link is to be shifted or used for another connection.

Especially for the angular arrangement of the link relative to the second profile bar, it is advantageous if a saw-tooth-shaped reciprocal-positive-engagement arrangement is present on the inner surfaces of the clamping jaws and/or if ribs and/or dogs are provided that mate with slots in the other clamping jaw. Different form-fitting connection sites can be created in this manner. Providing a fine saw-tooth or the like reliably ensures angular adjustment of the link that encompasses nearly all the oblique angles $\alpha$. Ribs and/or dogs on the clamping jaws can be realized as more or less solid and are therefore suited in particular for solid implementations of the clamping jaws.

It is advantageous if the link has dimensions such that plural links with first profile bars connected thereto can be mounted next to one another at the same height on the second profile bar. This can advantageously be accomplished by having one tong leg of a clamping jaw of a link occupy no more than one half of a cross section of a casing groove of the second profile bar, into whose other half a tong leg of another link can be fitted.

This can be accomplished, in particular, in that the link and the end of the first profile bar does project beyond the median planes of two casing grooves which are occupied by clamping jaws and both of which extend through the longitudinal axis of the second profile bar. If no portion of the link projects beyond the aforesaid median planes, a second link can easily be mounted at the same height on a second profile bar. First profile bars of various contours can be fastened to the second profile bar by means of the links. The sole condition is that the end of the profile bar not project beyond the aforesaid median planes of the link concerned or adjacent links.

It is preferable that the tong legs be form-fittingly adapted to an undercut of a casing groove of the second profile bar. The tong legs thereby engage in the undercuts. The connection between the tong legs and the second profile bar are connected to each other against accidental detachment more effectively, that is, with a stronger form-fit. When the clamping jaws are tightened by means of the fixing element, a form fit is immediately produced between the tong legs and the undercut. This facilitates subsequent adjustment of the relative positions of the profile bars by displacement in the region of the form fit without it being necessary to take the connection completely apart for this purpose.

It is advantageous for the T-link if, when the tong legs are locked in position on the second profile bar, the clamping jaws have a spacing between them that permits linear and/or planar clamping of the inner webs. The clamping jaws are thus prevented from contacting each other in the vicinity of the second profile bar, which would hinder the proper clamping of the tong legs to the second profile bar and the force-fit of the clamping jaws in the inner webs.

It is especially advantageous if the two profile bars have both inner webs and casing grooves. Links can thus be inserted in both profile bars or mounted on them from the outside. This permits a large variety of connections, and the user need not pay attention to the type of connection for which the profile bar is actually intended. At the same time, the profile bar can be cut to length as needed and satisfies the requirements in terms of stability and use of the link at arbitrary locations. In addition, production of the profile bars is simplified if there is only one kind of bar.

The fixing element is arranged in an especially user-friendly manner and is especially easy to reach when the first profile bar is spaced apart from the second profile bar, thereby leaving the fixing element exposed radially. The fixing element thus can be reached and actuated easily with various tools. Again, there are no problems with respect to the stability of the link, owing to its large contact area with the inner webs or the inner circumference of the first profile bar.

Engagement of the tool in the fixing element is facilitated if the clearance leaving the fixing element exposed is formed between a cut-off end of the first profile bar and a polygonal or curved casing of the second profile bar. If the end of the first profile bar and such a polygonal or curved casing of the second profile bar abut each other in the final assembled position, the link is imparted a firmer hold by the additional support. Furthermore, the fixing element can easily be reached by the tool through the clearance formed as a result of the slope of the casing surface of the second profile bar in the case of a polygonal or curved shape. The slope produced by the polygonal or round shape can be realized so that it is adapted to the angular position of the inserted tool, thus providing guidance for the tool.

To protect the connection point, it is advantageous that the link and the end of the first profile bar be covered by a cap disposed between the first and second profile bars. This prevents the ingress of dirt or moisture into locations on the first profile bar that have been left uncovered by the link and keeps any objects that may brush past the link from catching on its points or edges. Another purpose of this cap is to provide a visually pleasing implementation for the transition from the first to the second profile bar.

To render the link easy to implement and inexpensive to manufacture, it is constructed in one piece, of a formed metal sheet that lends it rigidity, with two clamping jaws, each of which comprises a tong leg. The sheet-metal construction reduces the weight of the link while providing a reliable fit due to the one-piece construction. In addition, sheet metal is easy to shape, which is especially important in the case of the tong legs in order to provide an exact form-fit and secure retention on the outer casing grooves and so that angular adjustments can be made precisely.

An advantageous, sturdy implementation of the link consists in realizing the clamping jaws as solid. Such solid construction ensures that the link will not deform, even when vigorously tightened. In addition, it is especially easy in this case to add formed-on elements that prevent relative parallel movement by being in reciprocal positive engagement.

A further substantial improvement of the T-link is achieved by giving the elongate clamping jaws opposite cambers from end to end. Owing to their camber, the clamping jaws are spaced apart from each other in the region of the fixing element. Actuating the fixing element causes this spacing to be eliminated and the clamping jaws to contact each other, especially in the region of the inner webs, in a force-fitting manner, specifically planarly or linearly in the longitudinal direction of the clamping webs. This excludes the possibility of the clamping jaws resting on the inner webs only at points or for short distances. This is true in particular when the fixing element acts with a predetermined force on the two clamping jaws, which are clamped by means of tong legs to the second profile bar and simultaneously clamp the inner webs of the first profile bar. When a screw is used as the fixing element, such a force exerted on the clamping jaws is predetermined by the fact that the screw is tightened to a set tightening torque.

An improvement of the T-link can provide that the clamping jaws are provided at their ends with slots which, when the clamping jaws are tightened, constitute circumferential portions of a bore and/or a threaded bore. The bore or threaded bore can be used for mounting or fastening purposes in the region of the T-link. In addition, such bores make it possible to use the link for other purposes than its designated one of interconnecting two profile bars.

Use of the link is facilitated if the clamping jaws are clasped together in pairs by spring clips. This is the case, in particular, when the two clamping jaws are not yet joined together in a captive manner by a fixing element, or when a fixing element that is already present does not, or does not yet, hold the clamping jaws of the link captive.

A further advantageous embodiment of the T-link is distinguished by the fact that the clamping jaws are provided on both sides with oblique faces to center them on the inner webs. Said oblique faces serve the purpose of automatically positioning the clamping jaws on the inner webs, especially during the securing of the clamping jaws. They prevent the clamping jaws from being seated too far onto one inner web and failing to grip the other inner web adequately.

Realizing the clamping jaws of the link as ball-shaped at the insertion end makes it possible to adjust the first profile bar to almost any desired angular position between 0 and 45°, measured between a vertical to the longitudinal axis of the second profile bar and the longitudinal axis of the first profile bar, and limited only by the end of the first profile bar and the tong ends of the link. The clamping jaws are then locked in place, as described hereinabove, by squeezing them together or forcing them apart inside the first profile bar.

An especially light and multi-purpose structure is obtained if both profile bars are hollow profile sections. The profile bars can be provided with inner webs and casing grooves over their entire length. In this way, profile bars cut to any desired length will always afford a secure hold for the link applied to them, because the webs and grooves are present throughout. A structural unit is then a bar of the desired total length that can be divided into smaller bars, together with the desired number of identically realized links.

The first profile bar is held securely on the second profile bar, even under high transverse loads, if the jaws are locked in position on the second profile bar skipping one casing groove. This type of arrangement provides a sufficiently broad base for "wobble-free" support of the link. If the casing of the second profile bar is round, the forces exerted on the casing surface by the tong-like ends of the link are directed almost in a tangent to the casing surface. Thus, the forces that are generated with the proposed arrangement of the link do not deform the second profile bar, but instead merely act parallel to its casing surface. Much greater forces can be withstood in this manner than when the force components are predominantly perpendicular to the casing surface. The proposed fastening arrangement therefore ensures retention by the link that is more secure and at the same time places minimal stress on the profile bars.

The T-link can be realized in such a way that profile bars of, if necessary, different cross sections comprise casing grooves having the same pitch and/or so that the inner webs of both profile bars are arranged in the same assignment to one another or at the pitch of the casing grooves. In particular, casing grooves of the same pitch on both profile bars furnish an attractive outward appearance for the structure as a whole and also improve the feasibility of different structures. If the inner webs of both profile bars are used in the same assignment to one another, this promotes the desired uniform appearance of the structure. A similar effect can also be achieved or enhanced by having the inner webs of both profile bars be arranged in the same assignment to the pitch of the casing grooves.

Structures made from profile bars can pose the requirement that profile bars have different moments of resistance or resistance loads in different planes. This is true, for example, of profile bars with oblong cross sections. To this end, the T-link can be improved such that profile bars of oblong cross section have at least one subdividing transverse wall occupied by inner webs whose distance from aligned inner webs of the profile bars and/or additional transverse walls is adapted to the width of the clamping jaws. The inner webs of the transverse wall can also be used to connect the associated profile bar to another profile bar by clamping. For this purpose, the link used or its clamping jaws employ, in the described manner, mutually opposite inner webs of a transverse wall or an inner wall of a profile bar or another, additional transverse wall.

An embodiment of a profile bar that is especially resistant to bending is refined in a T-link, in that between two transverse walls of a profile bar of oblong cross section there is space to arrange a link whose clamping jaws can be clamped onto inner webs of two wall segments of the profile bar that connect the transverse walls to each other. This enables a link to be arranged centrally.

BRIEF DESCRIPTION OF THE DRAWINGS

The invention is described with reference to exemplary embodiments depicted in the drawings, wherein.

DESCRIPTION OF THE PREFERRED EMBODIMENT

Figure 1:
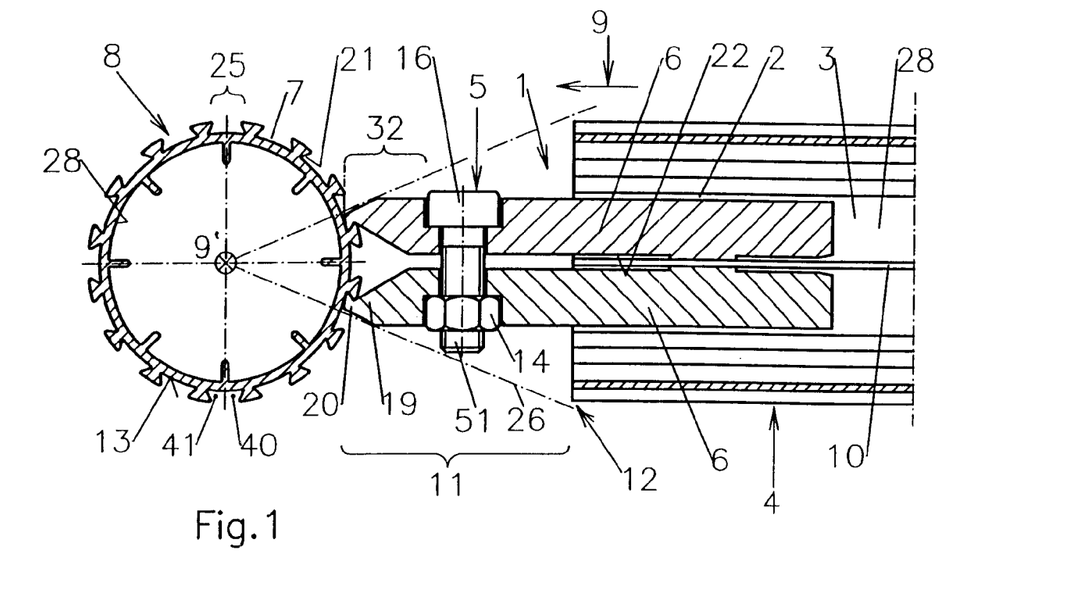
FIG. 1 is a longitudinal section through a link.

FIG. 1 shows a connection made from a first profile bar 4, a second profile bar 8 and a link 1, which engages by an insertion end 2 in a cavity 3 of first profile bar 4 and is secured there against being withdrawn. The link comprises two jaws 6 that are adjustable radially with respect to first profile bar 4 and can be acted upon by a fixing element 5. The clamping jaws 6 shown are realized as solid. By ball-shaped leg ends 20 of tong legs 19 of the clamping jaws 6, the link 1 is locked in position, closing like tongs, against undercut casing grooves 7 of second profile bar 8. Fixing element 5 presses jaws 6 firmly both against undercut casing grooves 7 of second profile bar 8 and against inner webs 10 of the first profile bar. Fixing element 5 is depicted as a screw comprising a screw head 16 and a threaded-on nut 14. Screw head 16 and nut 14 are sunk into two confronting clamping jaws 6. Jaws 6 of link 1 are secured by fixing element 5 against being withdrawn from first profile bar 4. They are retained on first profile bar 4 merely by a force fit or frictional fit. A leadthrough or opening in first profile bar 4 for anchoring fixing element 5 and thus link 1 is not necessary for secure retention. The first profile bar 4 is therefore realized without retaining holes.

The inner webs 10 disposed inside first profile bar 4 are arranged parallel to its longitudinal axis 9. In this way, the clamping of insertion end 2 of link 1 in cavity 3 of first profile bar 4 can take place along the longitudinal axis 9 at any desired longitudinal positions, as long as the inner webs 10 are clamped between the jaws 6. This makes for great flexibility in the arrangement of the link 1, for example should it prove necessary to adjust the seat of first profile bar 4 or second profile bar 8. In the final assembled position, which is shown in FIG. 1, there is a clearance 11 between the end 12 of the first profile bar 4 and a casing surface 13 of the second profile bar 8. Fixing element 5 of link 1 is thereby left exposed. It can easily be operated with a tool 50, which is shown in exemplary fashion in FIGS. 3 and 4.

Figure 5A:
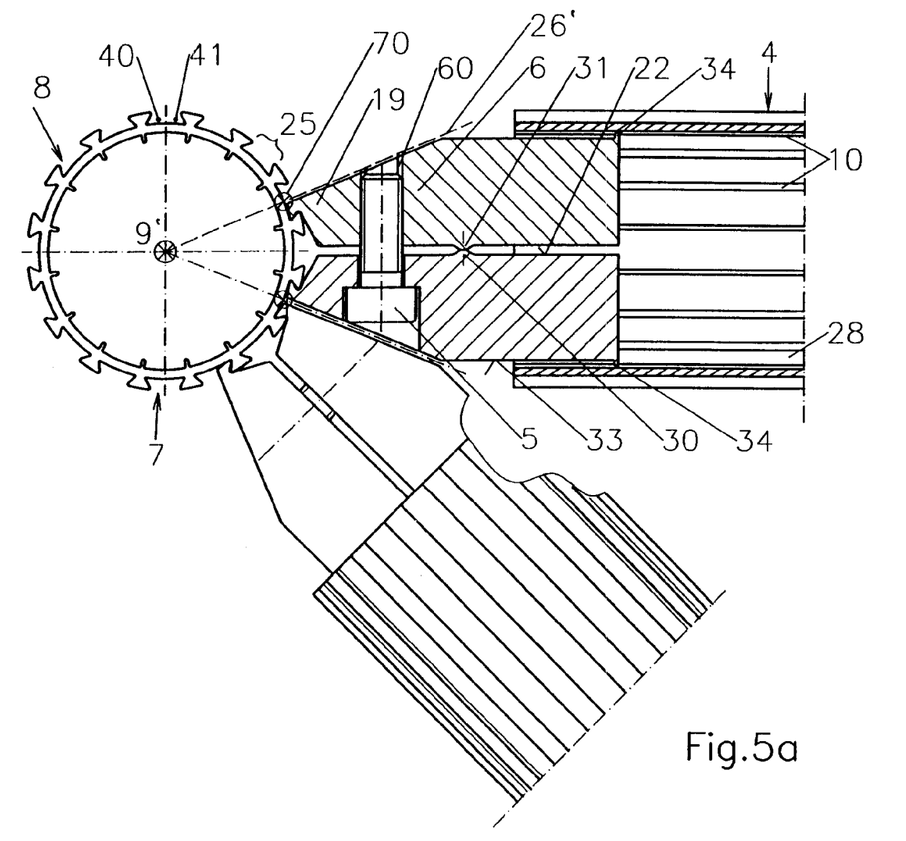
FIG. 5a is a longitudinal section through a first link and a second, adjacently disposed link.

The link 1 is constructed of two jaws 6 realized as separate parts. The fixing element 5 a serves both to apply the locking force and to provide a coupling between the clamping jaws 6 both in the mounted state and during the assembly process. The fixing element 5 realized as a screw can be screwed into both a nut 14 and a thread 60 provided in a clamping jaw 6, as shown in FIG. 5a. The size of the clearance 11 can be reduced if the fixing element 5 is tilted with respect to the sea longitudinal direction 9 of first profile bar 4. This is shown in the example of FIG. 3, where the head 16 of the screw is closer to second profile bar 8 than is the foot 51.

Figure 2:
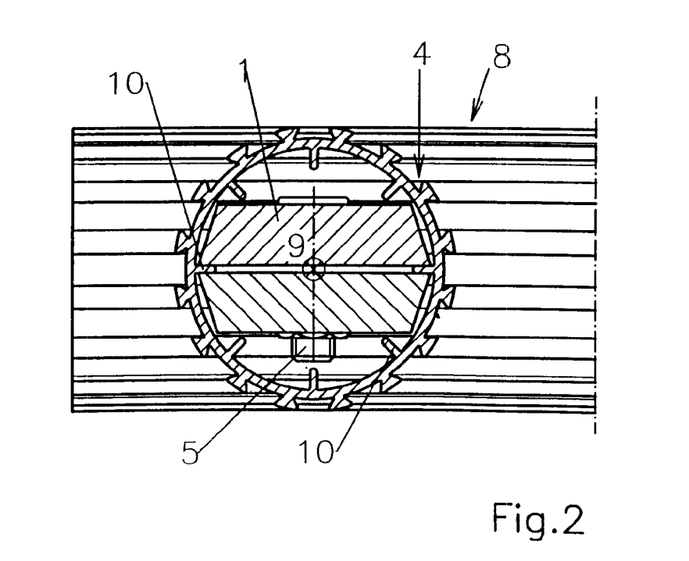
FIG. 2 is a cross section through a first profile bar.

FIG. 2 shows a connection of a first profile bar 4 to a second profile bar 8 by means of a link 1 as a cross section through the first profile bar 4 and the link 1. The jaws 6 of the link 1 are realized as plate-shaped and sit between the inner webs 10 of first profile bar 4, which are arranged diametrically in pairs. The inner webs 10 are disposed at an angular distance of 45° from one another relative to the center point or the longitudinal axis 9 of profile bar 4. This makes it possible to arrange the link 1 in various angular positions inside the first profile bar. The fixing element 5 holds the clamping jaws 6 of link 1 together in such manner that they clamp two inner webs 10 at a time between them at their outer edges.

Figure 3:
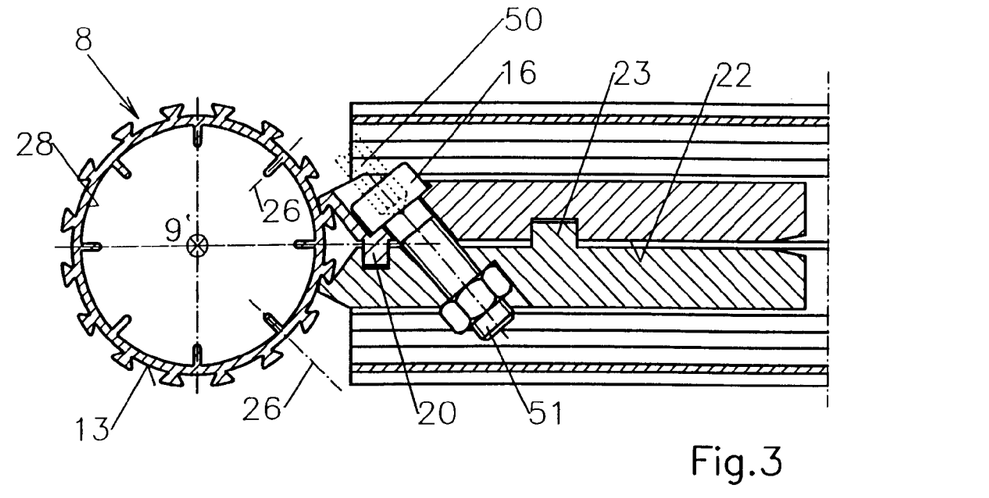
FIG. 3 is a longitudinal section depicting a link with an obliquely oriented screw.
Figure 4:
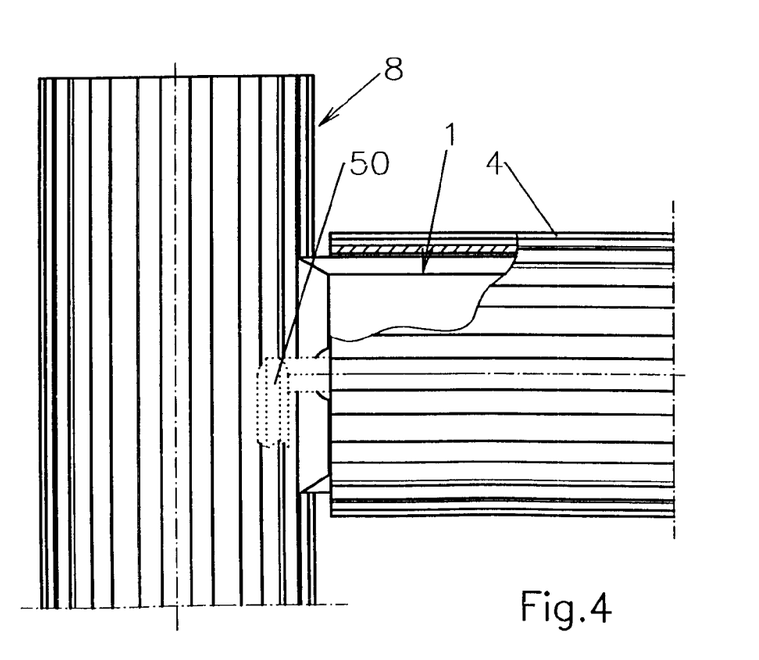
FIG. 4 shows a tool being used on a link.

FIG. 3 is a section through a connection comprising a tilted fixing element 5. The clamping jaws 6 are protected against reciprocal parallel movement by a reciprocal-positive-engagement elements 23. The positive-engagement elements 23 are disposed on the inner surface 22 of each clamping jaw 6. Any desired number of these positive-engagement elements 23 can be provided. In particular, the provision of a reciprocal-positive-engagement element with inclined, mutually adjacent teeth ensures secure positive engagement even with a link 1 that is arranged at an angle relative to profile bar 8 (see FIG. 8). A tilted fixing element 5 makes it possible to introduce a tool 50 even when the clearance 11 between profile bars 4 and 8 is very small, as shown in FIG. 4.

FIG. 5a shows two links mounted next to each other at the same height on the second profile bar 8. Link 1 has on the inner surface 22 of a clamping jaw 6 a formed-on element 30 that rests on the formed-on element 31 of the other clamping jaw 6. When fixing element 5, realized as a screw again in FIG. 5a, is tightened, the tong legs 19 of clamping jaws 6 are pressed together and thereby engage in the undercuts of casing grooves 7 of second profile bar 8. The formed-on elements 30, 31 cause the force of fixing element 5 to be diverted and clamping jaws 6 to be pressed apart radially at the insertion end 2 of link 1. This results in a force-fit between the outer circumference 33 of clamping jaws 6 and the inner wall 28 and/or inner webs 10 of first profile bar 4. In this case, clamping jaws 6 are no longer realized as plates at their insertion ends 2, but are semicircular. Outer circumference 33 therefore nearly conforms to inner circumference 28 of first profile bar 4, if it is realized as a round hollow profile section. The retention inside first profile bar 4 is improved by a sharp collar 34 passing around the insertion end of the link 1.

To attach plural identical links 1, each with a connected first profile bar 4, to a second profile bar 8, to achieve the tightest possible packing it is necessary that one tong leg 19 of a clamping jaw 6 of a link 1 occupy with its leg end 20 no more than half 40 the cross section 25 of a casing groove 7 of the second profile bar 8. A tong leg 19 of another link 1 can then be fitted into the other half 41. This is possible in particular if the link 1 and the end 12 of first profile bar 4 does not project beyond the median planes 26 of two casing grooves 7 occupied by clamping jaws. The median planes 26 are defined by the longitudinal axis 9' of the second profile bar 8 and a straight line 70 extending parallel to longitudinal axis 9' and through the center of the casing groove 7. In this manner, mutually abutting profile bars 4 can be packed tightly without interfering with each other.

The outer wall 33 of the clamping jaws 6 is semicircular, conforming to the shape of the inner wall 28 of first profile bar 4. When fixing element 5 is tightened, the outer walls are pressed against inner webs 10 of first profile bar 4. The small area of contact with inner webs 10 results in a high contact pressure and thus effective clamping.

Figure 6:
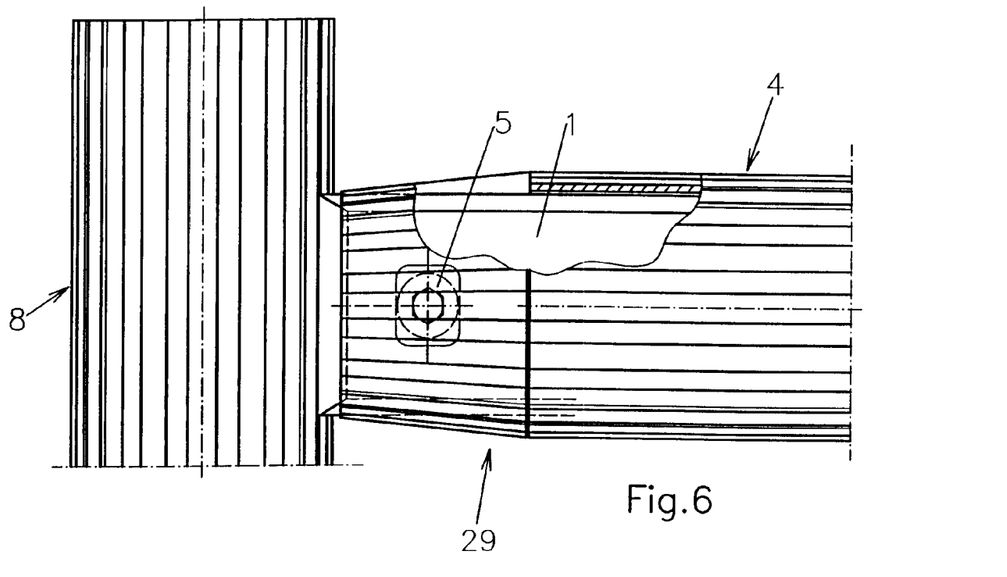
FIG. 6 shows a connection comprising a cap.

FIG. 6 is a side elevation of a connection comprising a link 1 and a fixing element 5. Disposed over the link 1 and between second profile bar 8 and first profile bar 4 is a cover 29. This can be made of plastic and is designed to prevent the ingress of dirt into first profile bar 4 and to keep fixing element 5 of the link 1 from being unreleasable, for example in adverse environmental conditions. The cap 29 also provides a more attractive visual impression. Profile bars 4, 8 are then also clad in a similar material, and the connection shown here thus merely serves as a framework and can be constructed in numerous variations.

Figure 7:
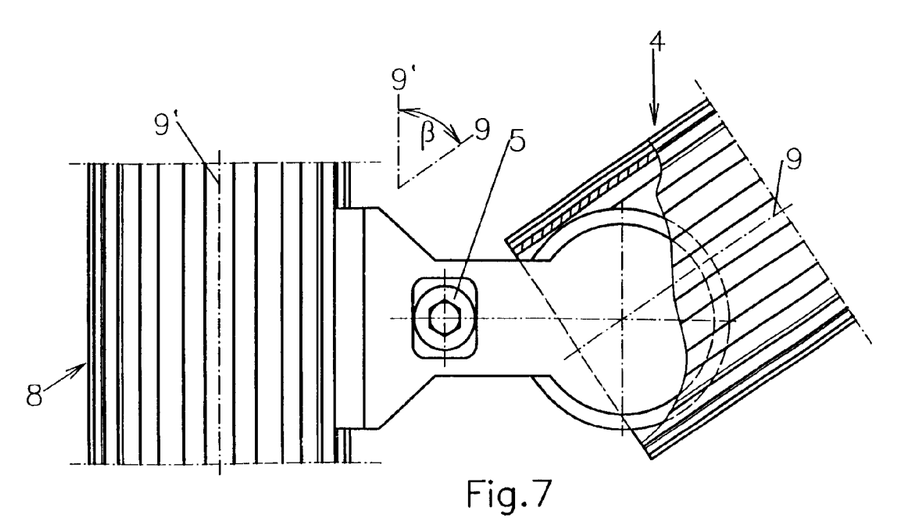
FIG. 7 is a side elevation of a connection in which the link has a ball-shaped end.
Figure 8:
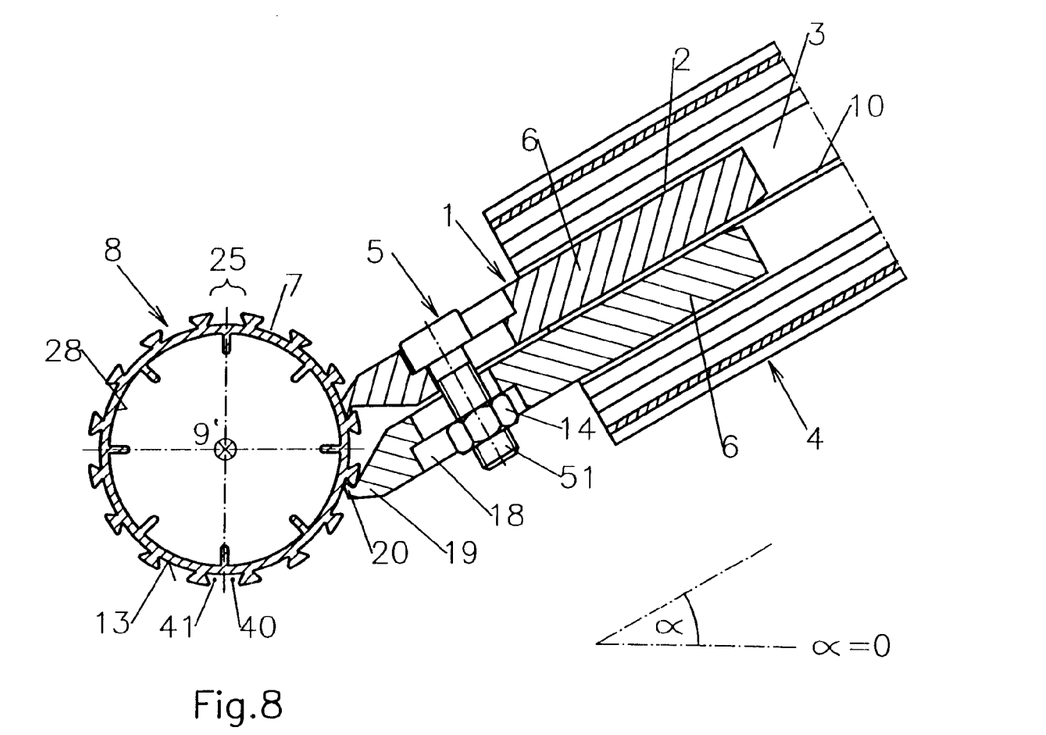
FIG. 8 shows a link tilted by an angle α.

FIG. 7 shows a spherical insertion end 2 of the link 1 that corresponds in cross section to the depiction of FIG. 2. The spherical realization of the insertion end 2 makes it possible to arrange the first profile bar within the plane of representation in various angular positions relative to the second profile bar 8. A condition for this is that the clamping jaws must be able to clamp onto the inner webs 10 of profile bar 4. In this way it is possible for the two axes 9 and 9' of profile bars 4, 8 to assume inclinations by angle $\beta$. Together with the inclinations $\alpha$ in a plane perpendicular to longitudinal axis 9' of second profile bar 8, which are shown in FIG. 8, this renders the entire angle space attainable for inclinations of first profile bar 4. Secure retention is still provided by the link 1 at the same time. All of these figures show round hollow profile sections. However, it is also conceivable to use profile bars of arbitrary cross section comprising at only one location a cavity 3 into which the link 1 can be inserted.

FIG. 8 shows a link 1 that is inclined by angle $\alpha$ in a plane perpendicular to longitudinal axis 9' of second hollow-profile bar 8. Clamping jaws 6 comprise slots 18 for the insertion of fixing element 5. In this way, the clamping jaws 6 can be moved in parallel relative to each other while the inner webs 10 of the first profile bar remain clamped. This results in an angular change a of link 1 relative to the normal position, in which $\alpha$=0.

More particularly, the leg ends 20 of tong legs 19 are realized as ball-shaped so that they can be used both in the position of the upper jaw shown in FIG. 8 and in the position of the lower jaw, without deforming themselves or deforming the groove area, when they are pivoted by an angle α.

Figure 9:
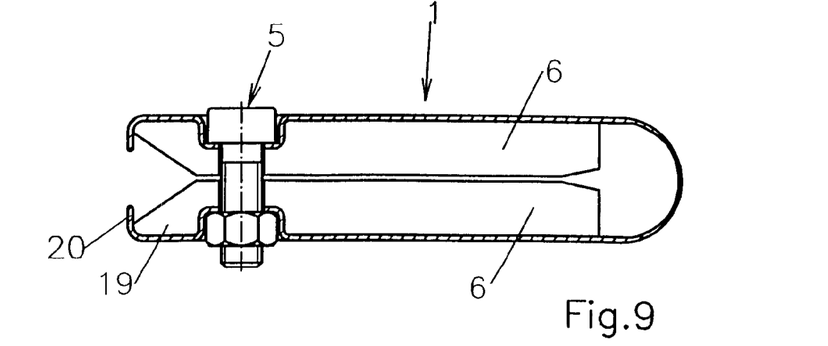
FIG. 9 is a longitudinal section through a link made of sheet metal.

FIG. 9 shows a link 1 made of rolled sheet metal. It is of one-piece construction, the clamping jaws 6 being elastically joined to the insertion end 2. Here again, the essential components of the link 1 are the clamping jaws 6, the fixing element 5, the tong legs 19 and the leg ends 20. It is advantageous that the shape imparted to the leg ends 20 is easier to fabricate, this ball shape being essential for angular adjustment by an oblique angle α.

Figure 10:
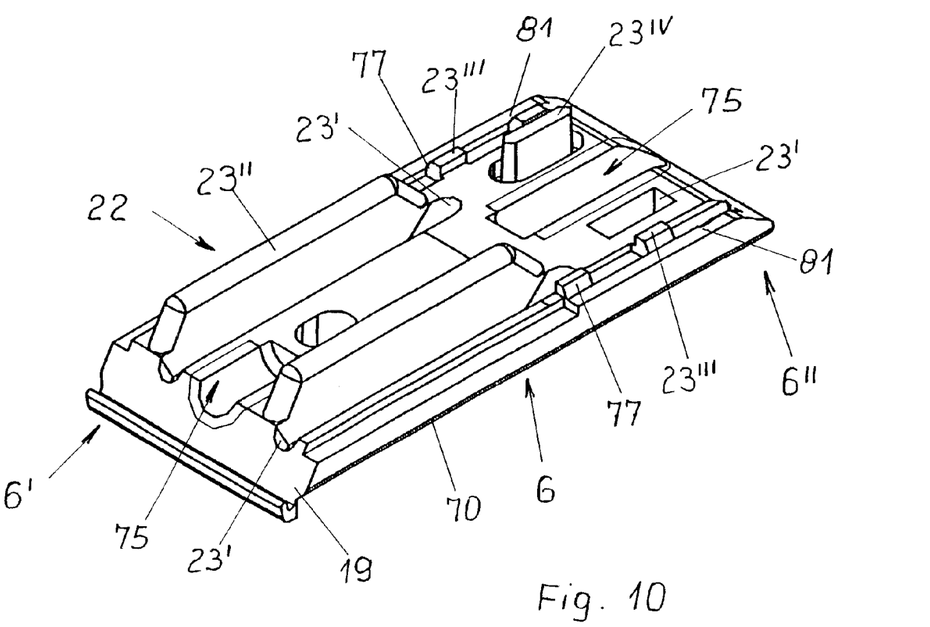
FIG. 10 is a perspective view of two clamping jaws that are to be fitted together vertically.
Figures 11, 12:
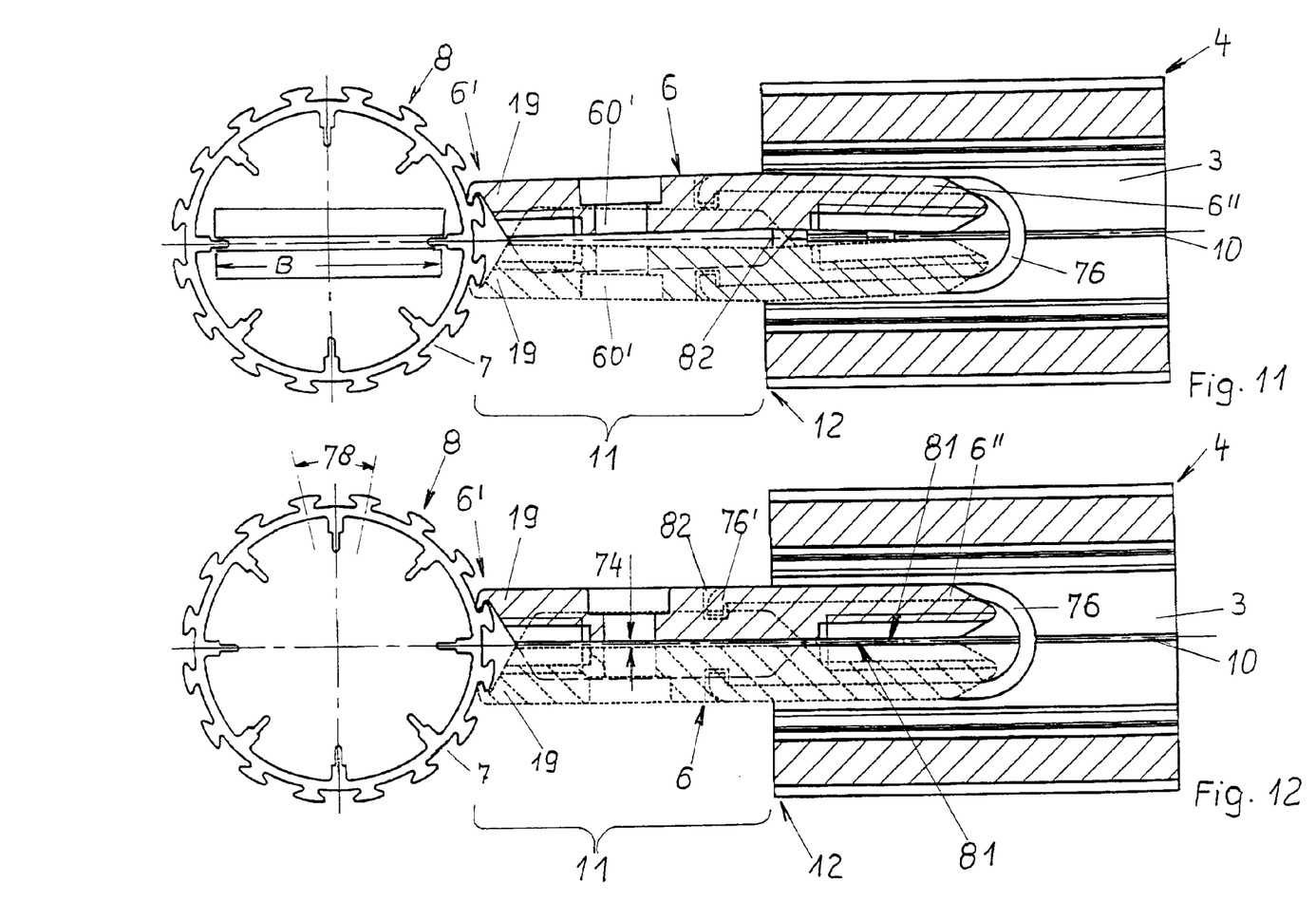
FIG. 11 is a sectional view of two clamping jaws that have not yet been clamped together, in mounting position.
FIG. 12 is a sectional view corresponding to FIG. 11, showing clamping jaws in clamping position.

FIG. 10 shows two clamping jaws 6 of a link, the lower one in a top perspective view and the upper one in a bottom perspective view. The tong legs 19 are disposed at the left ends 6' and, as depicted in FIGS. 11 and 12, are inserted into the casing grooves 7 skipping one casing groove. Located at the other ends 6" are clamping faces 81. They are disposed as far outward as possible, below longitudinal edges 70 of the jaws 6. By said clamping faces 81, the jaws rest on the inner webs 10 of the profile bars linearly in the longitudinal direction of profile bars 4 or in a planar manner.

The link 1 and its clamping jaws 6 must transfer stress originating in the structure between profile bars 4 and 8. Slots 23', ribs 23" and dogs 23$^{IV}$ serve to secure the relative positions of the two clamping jaws 6 with respect to each other. Disposed on each clamping jaw 6, at the end comprising the tong legs, are two ribs 23" arranged parallel to the longitudinal edges, and immediately adjacent thereto are slots 23'. The arrangement is such that a rib 23" of a clamping jaw 6 engages in a slot 23' in the other clamping jaw 6. The total of four ribs 23" and slots 23' ensures excellent form-fitting engagement transversely to the clamping jaws 6 within their joint plane and stabilizes the clamping jaws 6 against any bowing under load that might be caused in this location by the fixing element (not shown), and would exert its effect in throughholes 60'. The assembly of the clamping plates 6 is assisted by the additional dogs 23$^{IV}$, which are realized as comparatively long so that they can be inserted guidingly in deep slots 23' in the respectively other clamping jaw 6, thus making it easier to fit the clamping jaws 6 together. In addition, dogs 23''' are provided in the vicinity of the clamping faces 81, the dogs 23''' of the lower clamping plate 6 of FIG. 10 being offset longitudinally relative to the dogs 23''' of the upper clamping plate 6 of FIG. 10. The dogs 23''' of the clamping plates 6 do not interfere with each other during the assembly of the clamping plates 6.

FIGS. 10 to 12 all show, at ends 6', 6", slots 75 realized as portions of either a bore or a threaded bore. Mutually adjacent slots 75 of clamping jaws 6 are of the same length in each case. Together they form an insertion bore or screw bore that can be used in a fastening operation. Imagining second profile bar 8 of FIG. 12 to be absent, from its position a screw could be screwed into the threaded bore between ends 6' between clamping jaws 6, and a plate, for example, or a profile bar supporting a screw head, could be fastened centrally to profile bar 4, i.e., in accordance with the realization of clearance 11 or resting directly on the end of profile bar 4 if the link 1 were to be inserted all the way into profile bar 4, although in this case it would be necessary to provide lateral access to the fixing element in profile bar 4.

A particularity of the clamping jaws 6 that is illustrated in FIG. 11 consists in their being realized as cambered from end 6' to end 6". The two clamping jaws 6 have opposite cambers, producing the spacing 82 shown in FIG. 11. The ribs 23" terminate in this area. It is possible for the clamping jaws 6 to be deformed here when the fixing element urges the clamping jaws 6 together. As a result, the clamping jaws 6 bow under this stress until the clamping faces 81 rest planarly on the clamping webs 10. The deformation of the clamping jaws 6 is then stopped, thereby achieving the desired planar contact between clamping faces 31 and inner webs 10 that creates the requisite force fit between link 1 and profile bar 4. To this end, clamping jaws 6 are realized so that they do not contact each other in the region of the fixing element and tong leg 19. They instead have the mutual spacing 74 illustrated in FIG. 12.

FIGS. 11 and 12 show, in addition to the foregoing, a mode of assembly of the two clamping jaws 6 employing U-shaped spring clips 76. The spring clips are centrally outwardly disposed and thus do not interfere with engagement in the slots 75. The spring clips 76 are, for example, constructed of wire and have ends 76' that are bent toward each other and that engage in retaining recesses 82 in the clamping jaws 6, as shown in FIG. 12.

Figure 13:
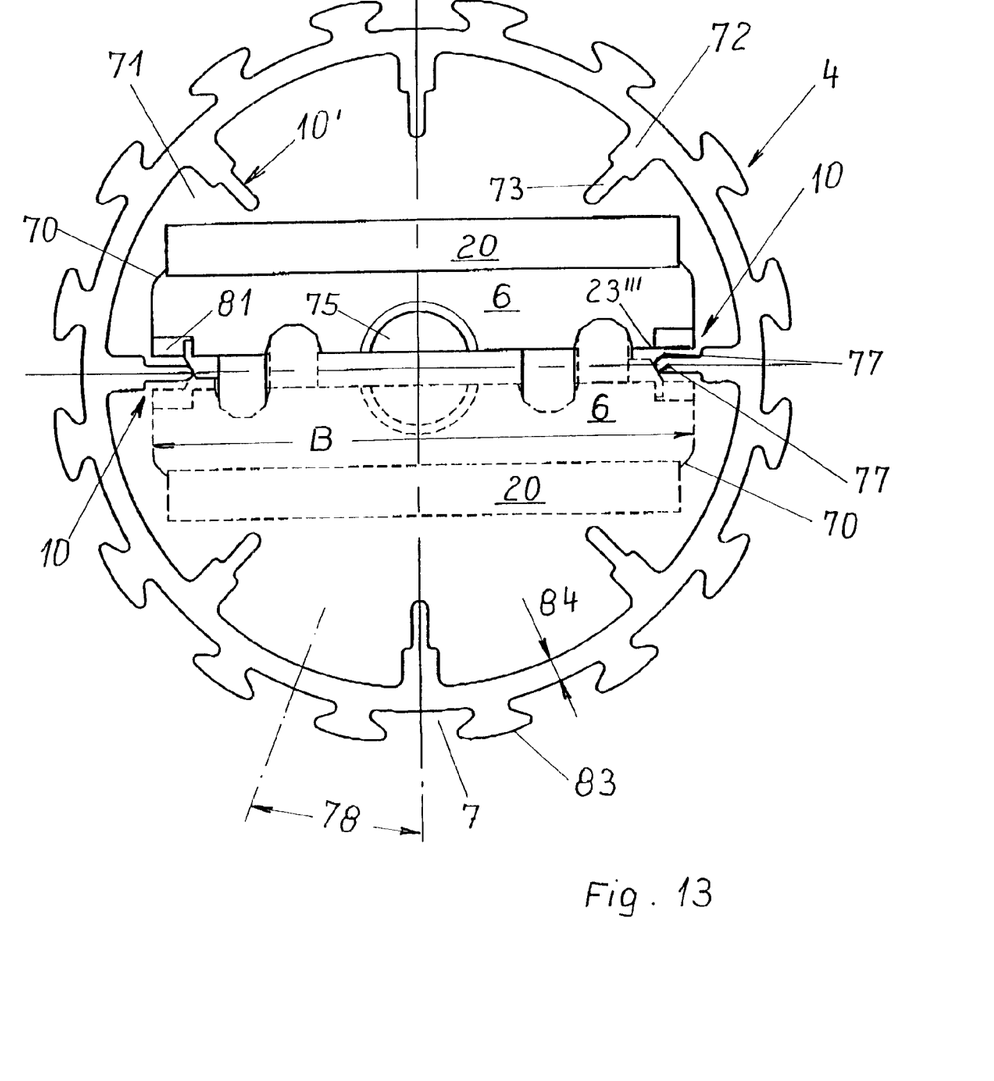
FIG. 13 is an end view of a first profile bar with clamping jaws in place.

FIG. 13 is an enlarged end elevation of a profile bar 4 in which clamping jaws 6 according to FIG. 11 have been inserted, i.e., the clamping jaws 6 have not yet been tightened. Thus, the inner webs 10 located between the two clamping jaws are not yet clamped. Eight inner webs 10 in total are distributed about the inner circumference of profile bar 4, i.e., at a pitch of forty-five angular degrees. Provided in the outer circumference of profile bar 4 are casing grooves 7, which are arranged at a pitch 78 that is half the pitch of the clamping webs, i.e., twenty-two and one-half angular degrees. The arrangement of the casing grooves is such that the inner webs 10 and the casing grooves 11 are aligned. Thus, the inner webs 10 are disposed centrally to the casing grooves, i.e., equidistantly from the outer webs 83 formed by the casing grooves. The inner webs 10 therefore strengthen the cross section of the profile bar against bowing under load, and particularly also against deformation of the comparatively thin wall thickness 84 in the region of the casing grooves. This is of particular significance when link 1, for example according to FIGS. 11, 12, skips one casing groove 7 as it engages second profile bar 8, thus lapping two outer webs 82. The segment of wall located between two outer webs 83 is stiffened definitively against bowing or caving in.

In FIG. 13, the upper clamping plate 6 is shown in solid lines and the lower clamping plate 6 in dotted lines. The arrangement of the clamping jaws in the cross section of the profile bar 4 must be such that the inner webs 10 can be as narrow as possible, i.e., that they not extend very far into profile bar 4. The clamping jaws 6 are consequently arranged with their longitudinal edges 70 close to the inner wall of profile bar 4, in a region 71 formed between two mutually adjacent inner webs 10. In FIG. 13, adjacent to each inner web 10 to be clamped is an inner web 10', and the clamping jaws 6 engage in the area 71 between these two webs 10, 10'. A sturdy implementation of the clamping jaws 6 is therefore possible in this case, and the clamping of the clamping faces 31 onto the inner webs 10 by means of such clamping jaws can also be sturdy, i.e., characterized by high contact pressure.

The end elevation of the clamping plates 6 shows the positioning of the dogs 23''' in relation to the inner webs 10. Oblique faces 77 are implemented on the dogs. The oblique faces 77 of the dogs 23''' of upper clamping plate 6 are set at an obtuse angle to the clamping faces 77 of the dogs 23''' of lower clamping plate 6. The free edges of the inner webs 10 fit into said obtuse angles. As a result, the clamping jaws 6 center themselves in the ends of profile bar 4 when inserted and also when said clamping jaws 6 are tightened by means of the fixing element, thereby achieving proper positioning of the clamping faces 81 on the inner webs.

The figures show inner webs 10 of different cross-sectional implementation. Whereas the inner webs 10 of FIG. 1, for example, have only one thickness, the inner webs of FIG. 13 have a stepped design. Each of the inner webs 10, 10' has at the end proximate the tube wall a thick base 72, whose thickness, like the thickness 84 of the tube wall, is relatively greater. Joined to the base 72 radially are clamping strips 73 whose thickness corresponds, for example, to the thickness of the inner webs 10 of FIG. 1. This thickness is designed to enable the clamping webs 10 to be clamped by the clamping jaws 6.

Figure 14:
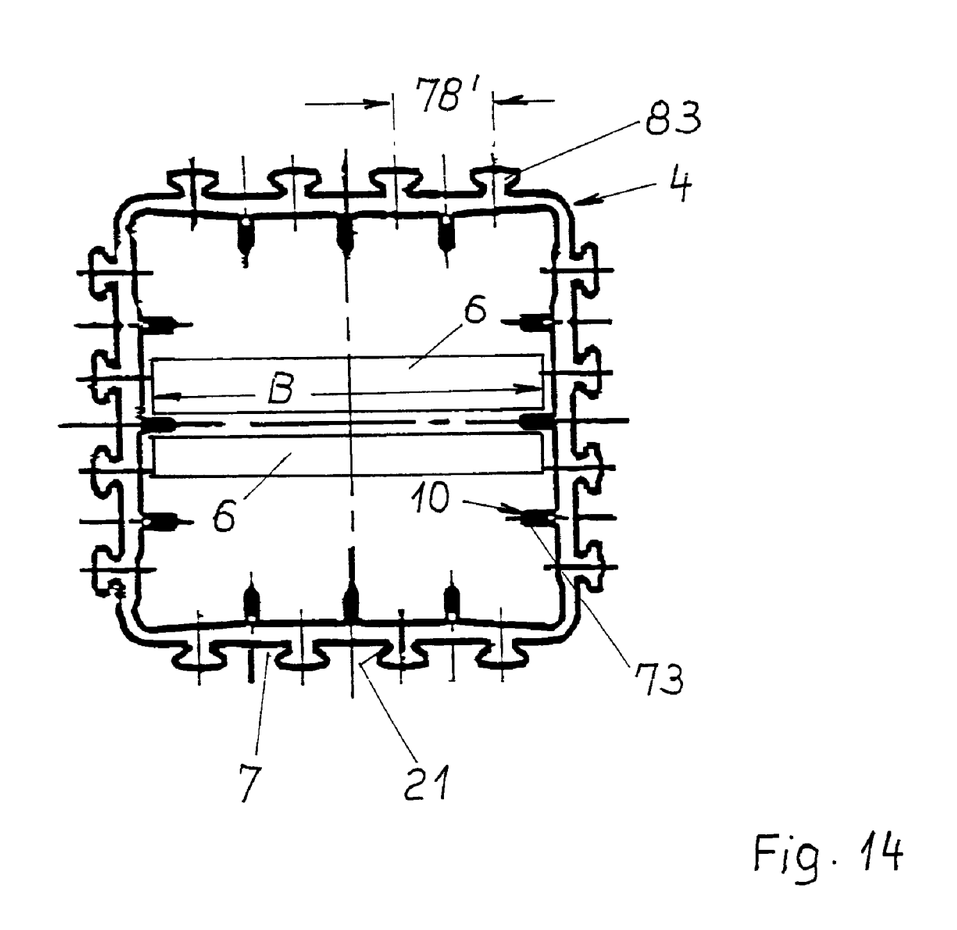
FIG. 14 is an end elevation of a square profile bar.

The use of a base 72 in conjunction with clamping strips 73 depends on how far apart the inner webs 10 and thus their clamping strips 73 are from each other. This distance E (see, for example, the top of FIG. 15) depends on the width B of the clamping jaws 6, since they must be able to grip the clamping strips 73 securely by means of the clamping faces 81. And the width of the clamping strips 73 is, in practice, adapted to the width of the clamping faces 81. Thus, if profile bars 4 of different cross-sectional shapes are to be clamped, specifically by means of links 1 whose clamping jaws 6 are of the same shape, then the width of the base 72 must be varied. FIG. 14 shows a square cross section of a profile bar 4 whose inner walls 85 are provided with inner webs 10. However, these inner webs 10 are realized simply as clamping strips 73. The width of the base 72 is zero. This is because the width B of the clamping jaws 6 used is the same as the width of the clamping jaws 6 of profile bar 4 of FIG. 11. Thus, the link 1 concerned is to be used both for the square profile of profile bar 4 and for the circularly cylindrical profile of profile bar 4 depicted in FIG. 11. This is apparent from a comparison of the profile of FIG. 14 with that of profile bar 8 of FIG. 11, it being a prerequisite that profile bars 4 and 8 be given the same profile and size. The width B of both links 1 is the same. The link 1 can be used with different profiles. The base 72 serves to equalize the length or the width, as needed.

Figure 15:
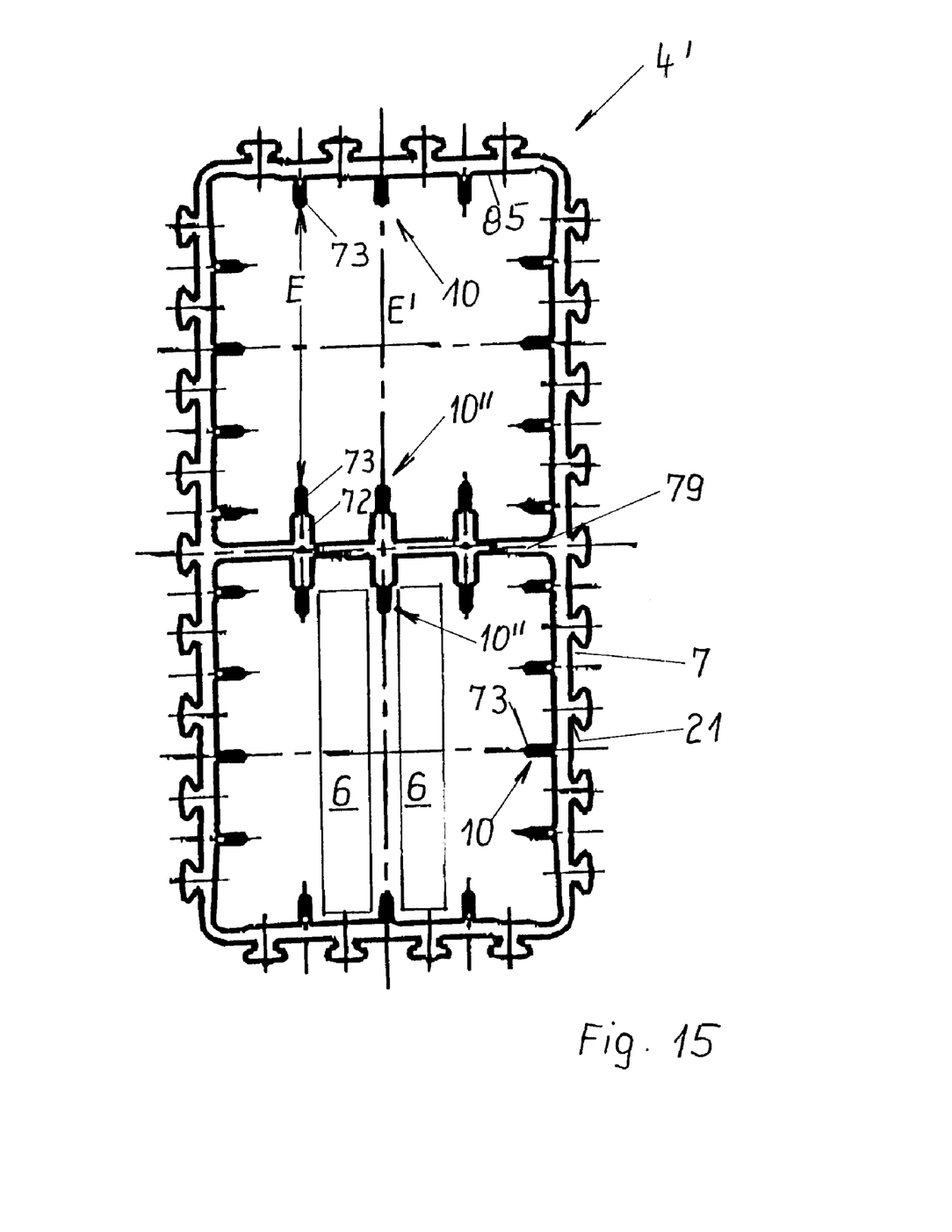
FIG. 15 is an end elevation of a rectangular profile bar.
Figure 16:
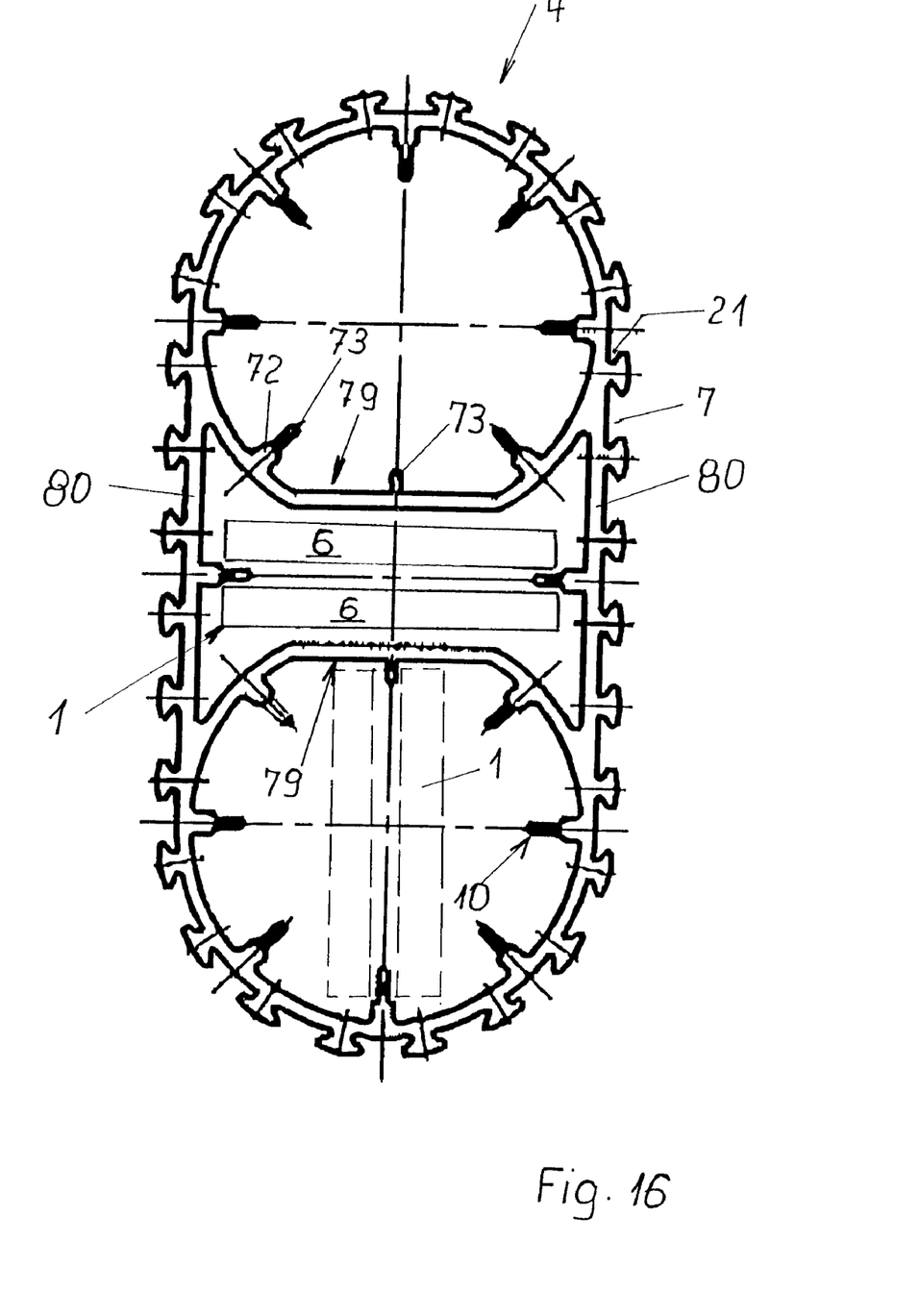
FIG. 16 is an end elevation of a special profile bar.

Compensating measures are also necessary when the cross sections of the profile bars 4, 8 are not circularly cylindrical or square, but oblong. Profile bars 4' of this kind are illustrated in FIGS. 15 and 16. FIG. 15 shows a double square profile bar 4' with a centrally disposed transverse wall 79. Transverse wall 79 is provided with inner webs 10", each comprising a base 72 and a clamping strip 73. The distance between the clamping strips 73 and the inner webs 10 aligned with inner webs 10" and disposed on inner wall 85 opposite and parallel to the narrow wall of the bar 4' is denoted by E. It corresponds to the distance E between the two clamping webs 73, which on one side form inner web 10 and on the other side, with a base 72, inner web 10". Thus, E, like E, is adapted to the width B of the clamping jaws 6.

FIG. 16 shows a profile bar 4' of oblong cross section, essentially formed by two circularly cylindrical profile bars arranged in parallel and joined by wall segments 80 to form an outwardly closed cross section. Thus, present on the inside are two transverse walls 79 that are flattened in the center to create space in which to arrange a link 1. Disposed centrally on the wall segments 80 are inner webs 10 onto which clamping jaws 6 of link 1 are clamped. Because of the flattening of the contour, only clamping strips 73 need be present in the flattened regions of the transverse walls 79 in order, if necessary, to dispose a link 1 there that is able to grip a clamping strip 73 as well as a clamping strip carried by a base.

The arrangements of the inner webs 10 show that the link 1 can be disposed in different angular positions relative to the profile bars 4, 4', 8. This makes for a wide variety of structural options for arranging profile bars relative to one another. This can be appreciated in particular from FIG. 16. Horizontally arranged links 1 as depicted in FIG. 16 can be used with profile bars that extend horizontally in the plane of representation, whereas if vertically arranged links 1 are present, vertically extending profile bars must be connected. In FIG. 16, for example, a profile bar with a circularly cylindrical or a square cross section can be connected vertically. Given suitable width dimensions, such second profile bars will cover the end face of profile bar 4'. An especially sturdy connection is obtained if one link 1 is inserted above upper transverse wall 79 and another below lower transverse wall 79. Such a connection is advantageous, for example, for table structures, in which the second profile bar might be realized as a table leg, whereas profile bar 4' depicted in FIG. 16 would support the table top over a relatively great length without the use of an additional table leg. A very sturdy frame could be constructed from profile bars 4' according to FIG. 16 if four profile bars 4' were connected horizontally to one another. A link 1 could then be placed at each connection point, i.e., one at the top, parallel to the upper transverse wall 79; one between the two transverse walls 79, as shown; and one below the lower transverse wall 79. This would accordingly be a threefold connection.

A prerequisite for the connections is that the profile bars 4', 4' to be joined together have pitches 78 for their casing grooves 7, and the same or twice that pitch, 78', for the outer webs 83 formed by the grooves. It is not important whether the arrangement of outer webs 83 shown in the figures occupies the entire circumference. A first profile bar to be connected can be completely planar outwardly, as long as it has the necessary clamping webs on the inside. All that matters is that suitable conformations including casing grooves 7 and outer webs 83 be present on the to-be-connected surfaces of two profile bars. For example, plate-like hollow profile sections can be used as profile bars or hollow-profile bars if they have one wide wall implemented in such a way that the tong legs 19 of the link 1 can be clamped thereto. Instead of the foregoing implementation of the pitch, a pitch that is twice as great is also acceptable if the outer webs 83 used afford the possibility of engagement in casing grooves 7 having only one solid outer web 83 between them.

What is claimed is:

1. A T-link of two profile bars, with a link (1) comprising two elongate clamping jaws (6) which can be tightened transversely by a fixing element (5) and which can be locked in position, closing like tongs, in undercut casing grooves (7) of a second profile bar (8), and which engage endwise in a cavity (3) in a first profile bar (4) and can be clamped onto cylindrically parallel inner webs (10) of the first profile bar (4), and that are arranged between said clamping jaws, wherein the first profile bar (4) comprises more than two inner webs (10) evenly distributed about its inner circumference, in that said clamping jaws (6) are adapted to clamp the inner webs (10) with longitudinally linear contact, and in that said clamping jaws (6) engage by each of their longitudinal edges (70) in a respective clearance (71) provided between the clamped inner web (10) and an inner web (10') adjacent thereto.

2. A T-link as recited in claim 1, wherein said inner webs (10) are distributed about the inner circumference of the first profile bar (4) at intervals of forty-five angular degrees.

3. A T-link as recited in claim 1, wherein each of the inner webs (10) is aligned with one of the casing grooves (7).

4. A T-link as recited in claim 1, wherein each of the inner webs (10) has a thick base (72) and, extending radially therefrom a thinner clamping strip (73) that can be clamped between said clamping jaws (6).

5. A T-link as recited in claim 4, wherein a width (B) of said clamping jaws (6) being given, the extension of said thick base (72) of each of the inner webs (10) in a radial direction is determined by a distance (E) between two diagonally opposite clamping strips (73).

6. A T-link as recited in claim 1, wherein in a final assembled position of the profile bars (4, 8), the fixing element (5) of the link (1) can be actuated through a clearance (11) between one end (12) of the first profile bar and a casing surface (13) of the second profile bar (8).

7. A T-link as recited in claim 1, wherein the link (1) consists of two clamping jaws (6) realized as separate parts, adjustably connected by the fixing element (5).

8. A T-link as recited in claim 1, wherein the fixing element (5) comprises a screw and is inclined with respect to a longitudinal direction (15) of the first profile bar (4) and the end (12) of the first profile bar (4) is disposed at a distance (11) from the second profile bar (8).

9. A T-link as recited in claim 8, wherein said screw is inclined with its head (16) toward the second profile bar (8).

10. A T-link as recited in claim 1, wherein the link (1) comprises, for the fixing element (5), one hole extending perpendicularly to said clamping jaws (6) and another hole extending obliquely thereto.

11. A T-link as recited in claim 1, wherein the link (1) comprises in one clamping jaw (6) an elongated hole (18) for the insertion of the fixing element (5), and tong legs (19) of the link (1) can be clamped to the second profile bar (8) at different final angular positions of the link (1) by means of ball-shaped leg ends (20) that are inserted are inserted into undercuts (21) of the casing grooves (7).

12. A T-link as recited in claim 1, wherein said clamping (6) are disposed in a reciprocal positive engagement (23) that prevents relative transverse and parallel movement thereof.

13. A T-link as recited in claim 12, wherein a saw-tooth-shaped reciprocal-positive-engagement arrangement is present on inner surfaces (22) of said clamping jaws (6) and there are provided selected ones of longitudinally extending dogs ($23^{IV}$) and ribs (23") that engage in longitudinal grooves (23') in the other clamping jaw (6).

14. A T-link as recited in claim 11, wherein a tong leg (19) of a clamping jaw (6) of a link (1) takes up no more than one half (40) of the cross section (25) of a casing groove (7) of the second profile bar (8), into whose other half (41) a tong leg (19) of another link (1) can be fitted.

15. A T-link as recited in claim 6, wherein the link (1) and said end (12) of the first profile bar (4) do not project beyond the median planes (26) of two casing grooves (7) which are occupied by clamping jaws and both of which extend through a longitudinal axis (9') of the second profile bar (8).

16. A T-link as recited in claim 11, wherein said tong legs (19) are adapted form-fittingly to an undercut (21) of a casing groove (7) of said second profile bar (8).

17. A T-link as recited in claim 11, wherein when said tong legs (19) are locked in position against the second profile bar (8), said clamping jaws (6) have a spacing (74) therebetween that permits linear clamping of the inner webs (10).

18. A T-link as recited in claim 1, wherein the two profile bars (4, 8) comprise both inner webs (10) and casing grooves (7).

19. A T-link as recited in claim 1, wherein the first profile bar (4) is spaced apart from the second profile bar (8), thereby leaving the fixing element (5) exposed.

20. A T-link as recited in claim 8, wherein the distance (11) leaving the fixing element (5) exposed is formed between a cut-off end (12) of the first profile bar (4) and a casing (13) of the second profile bar (8).

21. A T-link as recited in claim 6, wherein a cap (29) arranged between the first profile bar (4) and the second profile bar (8) covers the link (1) and the end (12) of the first profile bar (4).

22. A T-link as recited in claim 1, wherein the link (1) is constructed in one piece, of formed sheet metal that lends it rigidity, with two clamping jaws (6), each of which comprises a tong leg (19).

23. A T-link as recited in claim 22, wherein said clamping jaws (6) are solid.

24. A T-link as recited in claim 7, wherein said clamping jaws (6) are oppositely cambered from end (6') to end (6").

25. A T-link as recited in claim 24, wherein said clamping jaws (6) are provided at their ends (6', 6") with slots (75) which, when said clamping jaws (6) are tightened, constitute circumferential portions of a bore.

26. A T-link as recited in claim 1, wherein said clamping jaws (6) are clasped together in pairs by spring clips (76).

27. A T-link as recited in claim 23, wherein said clamping jaws (6) are provided on both sides with oblique faces (77) to center them on the inner webs (10).

28. A T-link as recited in claim 23, wherein said clamping jaws (6) of said link (1) are realized as spherical at an insertion end.

29. A T-link as recited in claim 1, wherein the profile bars (4, 8) are round hollow profile sections.

30. A T-link as recited in claim 18, wherein the jaws (6) are locked in position against said second profile bar skipping one casing groove (7).

31. A T-link as recited in claim 18, wherein the profile bars (4, 8) comprise casing grooves (7) having a same pitch (78), and the inner webs (10) of both profile bars (4, 8) are arranged at the pitch (78) of said casing grooves (7).

32. A T-link as recited in claim 1, wherein profile bars (4') of oblong cross section comprise at least one subdividing transverse wall (79) occupied by inner webs (10") whose distance (E') from aligned inner webs (10) of the profile bars (4') and additional transverse walls (79) is adapted to the width (B) of said clamping jaws (6).

33. A T-link as recited in claim 32, wherein between two transverse walls (79) of a profile bar (4') of oblong cross section there is space in which to arrange the link (1) whose clamping jaws (6) can be clamped onto the inner webs (10) of two wall segments (70) of said profile bar (4') that interconnect said transverse walls (79).

* * * * *